United States Patent [19]

Bjorner et al.

[11] Patent Number: 5,791,771
[45] Date of Patent: Aug. 11, 1998

[54] UNSYMMETRICAL ELLIPTICAL REFLECTOR FOR SPATIAL ILLUMINATION

[75] Inventors: Johannes A. S. Bjorner, Woodbury; Bennett Pardee, Redding, both of Conn.; Mark B. Braginsky, Longmeadow, Mass.

[73] Assignee: United Parcel Service of America, Inc., Atlanta, Ga.

[21] Appl. No.: 574,956

[22] Filed: Dec. 19, 1995

[51] Int. Cl.⁶ .................................................. F21V 7/00
[52] U.S. Cl. ........................... 362/297; 362/346; 362/347
[58] Field of Search ............................... 362/217, 260, 362/304, 346, 347, 297; 359/852, 867, 869

[56] References Cited

U.S. PATENT DOCUMENTS

| | | | |
|---|---|---|---|
| 1,631,610 | 6/1927 | Wood | 362/347 X |
| 3,678,260 | 7/1972 | Beal | 362/267 |
| 3,801,775 | 4/1974 | Acker | 235/61.11 E |
| 4,250,488 | 2/1981 | Haupt | 340/146.3 AG |
| 4,511,955 | 4/1985 | Ernst et al. | 362/347 |
| 4,612,608 | 9/1986 | Peitz | 362/297 |
| 4,699,497 | 10/1987 | Hinton et al. | 355/14 E |
| 4,877,949 | 10/1989 | Danielson et al. | 235/462 |
| 4,974,094 | 11/1990 | Morito | 358/225 |
| 5,073,954 | 12/1991 | Van Tyne et al. | 382/18 |
| 5,136,147 | 8/1992 | Medlitsky et al. | 235/472 |
| 5,185,822 | 2/1993 | Miura | 382/65 |
| 5,187,611 | 2/1993 | White et al. | 359/599 |
| 5,280,161 | 1/1994 | Niwa | 235/462 |
| 5,291,009 | 3/1994 | Roustaei | 235/472 |
| 5,313,373 | 5/1994 | Bjorner et al. | 362/19 |
| 5,325,276 | 6/1994 | Sullivan | 362/84 |
| 5,327,171 | 7/1994 | Smith et al. | 348/223 |
| 5,332,892 | 7/1994 | Li et al. | 235/462 |
| 5,399,852 | 3/1995 | Zheng et al. | 250/225 |
| 5,402,327 | 3/1995 | Gordin et al. | 362/298 |
| 5,408,084 | 4/1995 | Brandorff et al. | 250/208 |
| 5,430,282 | 7/1995 | Smith et al. | 235/455 |

FOREIGN PATENT DOCUMENTS

| | | |
|---|---|---|
| 33 19 562 A1 | 2/1984 | Germany . |
| 33 05 347 A1 | 8/1984 | Germany . |
| 60-118829 | 6/1985 | Japan . |
| 1-313743 | 12/1989 | Japan . |
| 1-313745 | 12/1989 | Japan . |
| 2111936 | 4/1990 | Japan . |
| 2-190707 | 7/1990 | Japan . |
| 1 566 447 | 4/1980 | United Kingdom . |

OTHER PUBLICATIONS

"High Intensity Light Line Using High Pressure Sodium Lamps," Kevin G. Harding and Robert Bieringer Spie vol. 1822 (1992); pp. 21-30.

*Primary Examiner*—Stephen F. Husar
*Attorney, Agent, or Firm*—Jones & Askew, LLP

[57] ABSTRACT

An unsymmetrical elliptical reflector for spatial illumination. The invention includes a novel reflector and a novel illumination system including the novel reflector. The novel reflector includes first and second, non-symmetrical, elliptical elongate reflector surfaces. The eccentricities of the first and second reflector surfaces are different such that they have common first foci and different conjugate foci. The novel illumination system incorporates the novel reflector and provides intense, focused illumination at two foci positioned at two heights above a conveyor surface. The illumination intensity between the two foci is sufficiently intense to provide adequate illumination of encoded labels carried on package surfaces at heights between the two foci.

20 Claims, 2 Drawing Sheets

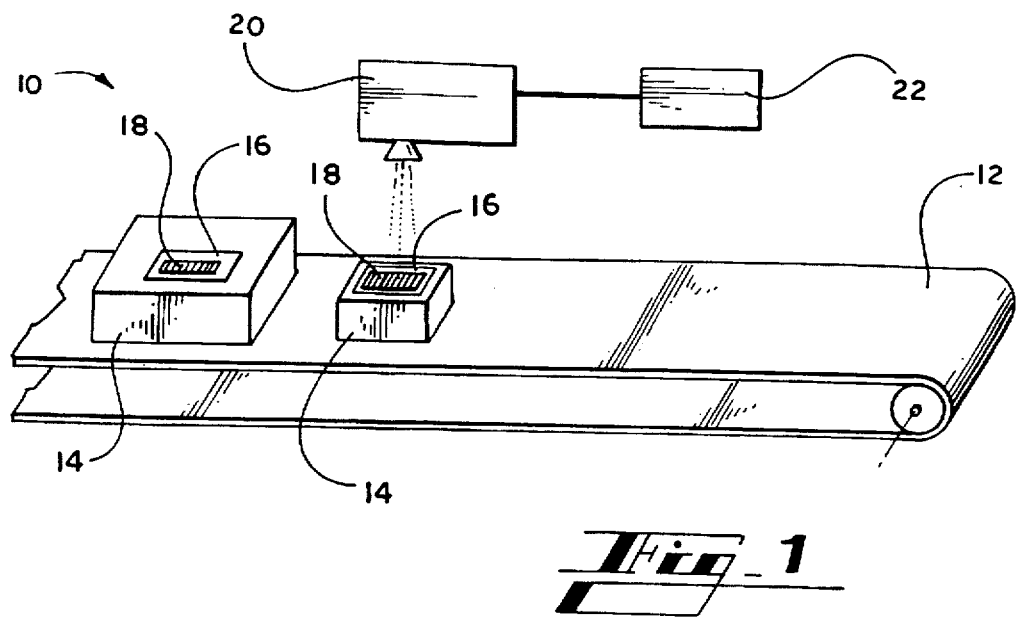
Fig_1
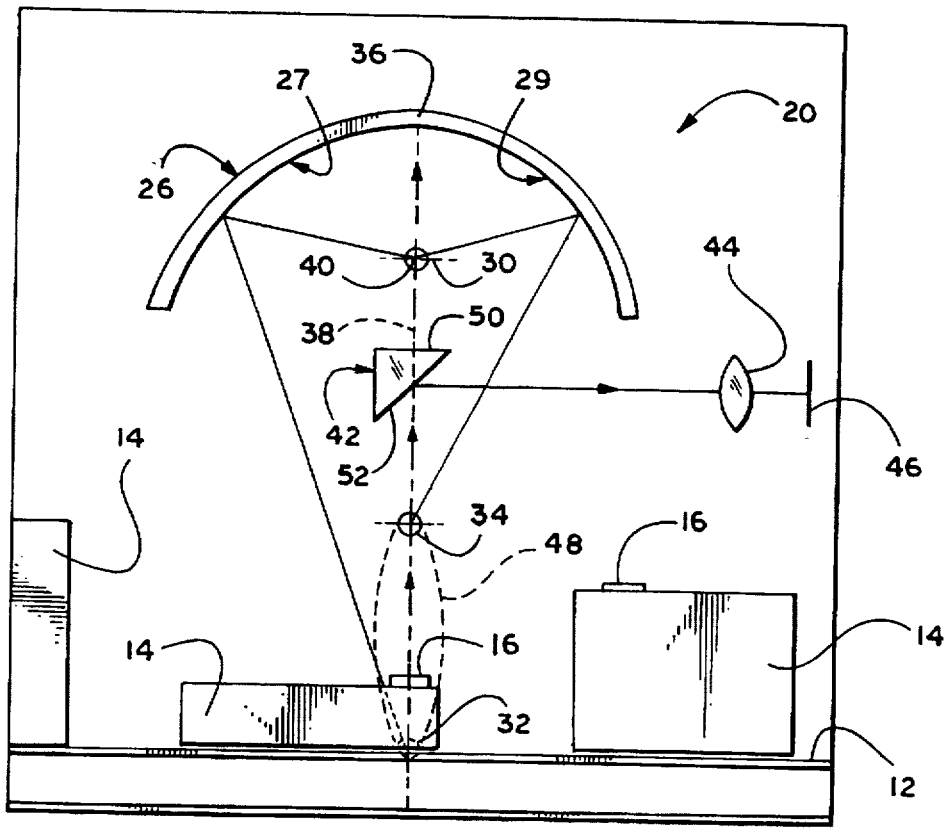
Fig_2

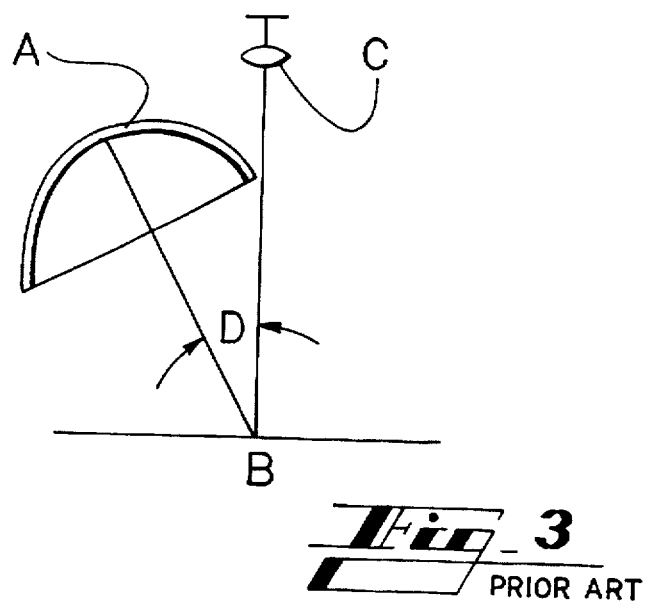
Fig_3 PRIOR ART
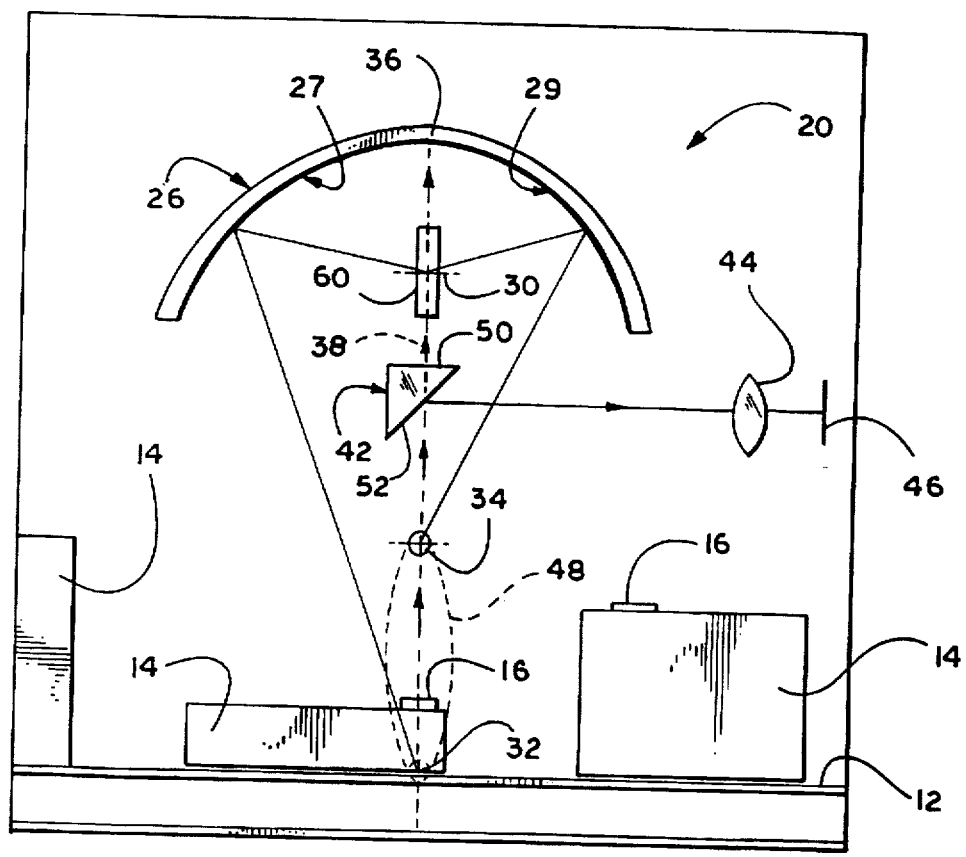
Fig_4

UNSYMMETRICAL ELLIPTICAL REFLECTOR FOR SPATIAL ILLUMINATION

TECHNICAL FIELD OF THE INVENTION

This invention relates to a reflector and illumination system, and more specifically relates to an unsymmetrical elliptical reflector for spatial illumination.

BACKGROUND OF THE INVENTION

The use of sorting machines to separate packages along an automated system is known. Such systems are useful in sorting a large number of packages for delivery to a number of different regions, such as zip code areas. Under the control of a computer or programmed logic controller, the packages are identified or coded before they enter the system, and may then be tracked for output at a chute or bin corresponding to the coded information. The packages are typically carried on a main conveyor and then transferred to other conveyors or collection bins depending on their intended final destination.

Optically encoded symbols are often used in high volume package handling operations. In the operation of these systems, an encoded label is applied to the package, and an optical scanning system scans the encoded label. Then a processor, such as a computer, decodes the information carried by the label and effects a response to the information. The encoded label includes information in the form of a symbol, such as a bar code or a two-dimensional dense code, printed on the label. The labels may be applied by the shipper prior to delivering the package to the carrier, or the carrier may apply the labels. The labels are applied at a conspicuous location on the package, usually prescribed by the carrier. During the sorting operation, the package must be placed on the conveyor such that the label will be viewable by the optical scanning system. Furthermore, package delivery systems sometimes use optical character recognition (OCR) systems to read text printed on shipping labels.

To insure sufficient resolution of the optical scanning system, the encoded labels applied to the packages are illuminated by artificial means such as high intensity lamps. The most efficient illumination is provided by focusing the lamp's beam onto the package surface bearing the encoded label. The packages carried by the sorting conveyor are usually of varying sizes, extending at varying heights from the conveyor surface. The illumination systems of the prior art generally utilize a single lamp and reflector system. Such an illumination system with a single focal length and a single point of focus provides fully focused illumination at a single height and a single point above the conveyor surface. Thus, packages with heights extending above or below this single point of focus may not be optimally illuminated, and the optical scanning system may be incapable of properly scanning the encoded labels applied to these packages. There is a need for an illumination system which can affordably supply fully focused illumination at a range of heights above the conveyor so that bar code labels on various-sized packages may be scanned.

SUMMARY OF THE INVENTION

The present invention solves the above problems by providing an illumination system with two focal lengths to provide intense, focused illumination at two focal axes positioned at two different heights above a conveyor surface. Also, the illumination intensity between the two focal axes is sufficiently intense to provide adequate illumination of encoded labels carried on package surfaces at heights between the two focal axes.

More particularly described, the present device provides a device for illuminating an elongated region. The device includes a light source and a reflector. The reflector has a first internal reflective elliptical surface defining a first focus and a first conjugate focus and a second internal reflective elliptical surface defining a second focus and a second conjugate focus. The first and second focus are located substantially in a single location, and the light source is located at the single location. At least a portion of the first internal reflective elliptical surface is separated a distance from the single location which is substantially the same as the distance separating a portion of the second internal reflective elliptical surface from the single location. The first conjugate focus is separated from the second conjugate focus a distance which is substantially equal to the height of the elongated region.

The light source may be an elongate lamp, which may extend substantially parallel to and along the first and second focal points. If the focal points are focal axes, then the elongated lamp may extended along these axes, or may extend perpendicular to these axes. The first conjugate focus, the second conjugate focus, and the first and second focuses are preferably located substantially parallel to and within a single plane, and the lamp preferably extends within the single plane.

An optical reflection system may be located along the single plane between the first and second foci and the first and second conjugate foci, the optical deflection system designed to reflect light reflected from an object located in the elongate region to an optical scanning system. The optical reflection system preferably is a right angle prism.

The present invention further provides a method of illuminating an object within an elongate region. The method involves the step of reflecting light from a light source located at an elliptical focus from a first internal reflective elliptical surface to a first conjugate focus and reflecting light from the same light source from a second internal reflective elliptical surface to a second conjugate focus, the first conjugate focus being separate from the second conjugate focus a distance which is substantially equal to the height of the elongated region. The object is then passed through the elongated region to illuminate the object.

Finally, the present invention provides a reflector having a first internal reflective elliptical surface defining a first focus and a conjugate focus, and a second internal reflective elliptical surface defining a second focus and a second conjugate focus. The second and first focus are located substantially in a single location, and at least a portion of the first internal reflective elliptical surface is separated a distance from the single location which is substantially the same as the distance separating a portion of the second internal reflective elliptical surface from the single location. The first conjugate focus is separate from the second conjugate focus.

Therefore, it is an object of the present invention to provide an improved reflector for use with an illumination system.

It is a further object of the present invention to provide an improved illumination system.

A further object of the present invention is to provide an improved illumination system including an elliptical reflector.

Another object of the present invention is to provide an apparatus and method of providing intense, focused illumination at a range of heights above a conveyor surface.

3

Still another object of the present invention is to provide an improved illumination system providing more than one focus and thus providing a wide range of luminance.

Yet another object of the present invention is to provide an apparatus for and a method of receiving light reflected from an encoded label surface at a zero angle of incidence.

Other objects, features, and advantages of the present invention will become apparent upon review of the following description of preferred embodiments and the appended drawing and claims.

BRIEF DESCRIPTION OF THE DRAWING

FIG. 1 is a schematic of an over-the-belt optical scanning system incorporating the unsymmetrical elliptical reflector of the present invention.

FIG. 2 is a schematic of the optical scanning system of the optical system of FIG. 1.

FIG. 3 is a schematic of a prior art reflector showing an angle of incidence which is greater than zero.

FIG. 4 is a schematic of an optical scanning system similar to that in FIG. 2, but incorporating a vertically oriented cylindrical lamp.

DETAILED DESCRIPTION

Referring now in more detail to the drawing, in which like numerals refer to like parts throughout the several views, FIG. 1 discloses an optical character recognition system 10 incorporating the present invention. The optical character recognition system 10 includes a conveyor 12 which carries packages 14 to be sorted by destination or group. The packages 14 may vary in size, shape, and height, and each includes an encoded label 16 having an encoded symbol 18, thereon. The encoded label 16 may be a bar code label, dense code label such as the MaxiCode symbology, or any other type of information label such as is well known in the art.

An optical scanning system 20 is located over the conveyor 12 for scanning the encoded label 16. A processor 22, such as a computer, receives the information from the optical scanning system 20, and decodes the information carried by the encoded label 16 and effects a response to the information, such as is taught in Smith, et al., U.S. Pat. No. 5,327,171, incorporated herein by reference.

Briefly described, the encoded labels 16 are applied in conspicuous locations on the packages 14, and the packages are loaded onto the conveyor 12 such that the encoded label 16 will be viewable line-by-line by the optical scanning system 20. The packages 14 then continue the conveyor 12, the characters on the encoded labels 16 are scanned by the optical scanning system 20, and the packages are ejected at a designated chute or conveyor, the particular ejection location being determined by the scanned data.

A schematic diagram of the optical scanning system 20 of the present invention is shown in FIG. 2. The optical scanning system 20 includes an elongate, trough-shaped reflector 26. The reflector 26 includes a first elliptical reflector surface 27 attached along the upper vertex of its curvature to a second elliptical, reflector surface 29. The reflector surfaces 27, 29, define a common focal axes 30 extending horizontally, or substantially parallel to the carrying surface of the conveyor 12, and extending transversely across the width of the conveyor 12. The reflector surface 27 defines a second focal, or conjugate axes 32, spaced below the reflector. Likewise, the reflector surface 29 defines a second focal, or conjugate axes 34. The reflector surfaces 27, 29 are unsymmetrical, and therefore have spaced apart conjugate focal axes 32, 34, the importance of which will be described in detail below.

A smooth transition 36 occurs between the first reflector surface 27 and the second reflector surface 29, because the ellipses formed by the foci of the two reflector surfaces have the same curvature in their common upper vertex. Thus, at the transition 36, the distance from the common focal axes to the first reflective surface 27 is the same as the distance between the common focal axes and the second reflector surface 29. An imaginary plane 38 extends vertically and preferably includes the common focal axes 30, the conjugate focal axes 32 of the first reflector surface 27, the conjugate focal axes 34 of the second reflector surface 29, and the transition 36. Thus, the reflector 26 has reflective surfaces 27, 29 which are located on opposite sides of and unsymmetrically about the plane 38.

A light source, such as an elongate lamp 40, is located at the common focal axes 30. The lamp 40 is preferably a high intensity lamp, such as a sodium vapor lamp having a cylindrical lamp envelope (not shown, but known in the art). The elongate lamp 40 is preferably positioned so that the longitudinal axes of the cylindrical glass envelope is supported coaxially with the common focal axes 30 of the elliptical reflector surfaces 27, 29.

An elongate optical prism 42 is preferably located along the plane 38 between the common focal axes 30 and the conjugate focal axes 32,34. The optical prism 42 is preferably designed to direct the vertical component of the light reflected from the encoded label 16 into receiving optics 44 of the optical scanning system 20. The light travels through the receiving optics 44 into a camera which may include a charged coupled device (CCD) 46.

The operation of the optical scanning system 20 is understood with reference to the above description. Light produced by the lamp 40 which is incident on the first elliptical reflector surface 27 is focused at that reflector surface's conjugate focal axes 32. Similarly, light incident on the second elliptical reflector surface 29 is focused at that reflector surface's conjugate focal axes 34.

The conjugate focal axes 34 of the second elliptical reflector surface 29 may be above or below the first reflector surface's conjugate focal axes 32, but, in the embodiment shown in FIG. 2, is located above the first reflector surface's conjugate focal axes 32. Thus, there are two points of high intensity, focused illumination. The light diverging from the conjugate focal axes 34 from the second reflector surface 29 combines with the light converging to the conjugate focal axes 32 of the first reflector surface 27 to provide a region 48 of high illumination between the two conjugate axes. It has been found that the described system produces an illumination region 48 in which there is twenty percent (20%) or less variation in illumination between the first and second conjugate focal axes 32, 34.

Encoded labels 16 carried on packages 14 supported within the region 48 of high luminance will be illuminated at an intensity level sufficient to be properly scanned by the optical system 20.

By properly selecting the curvature of the inner reflector surfaces 27, 29, the region 48 of illumination may be properly sized such that it extends a range which is sufficient to illuminate encoded labels 16 on the shortest to the tallest of packages which are moving along the conveyor 12. The use of an elliptical reflector for shaping and transferring the light output from a power lamp is known, and is described in various publications including "High Intensity Light Line Using High Pressure Sodium Lamps", Harding and Bieringer, SPIE Proceedings, Vol. 1822 (1992), incorporated herein by reference. By using such information, unsymmetrical elliptical reflector surfaces may be chosen which meet each of the requirements of this invention and which create an optimal region 48 for the packages 14 being sorted. Moreover, the length of the elliptical reflector 20 may be chosen such that the encoded labels 16 fall in the region 48, regardless of the location of the package on the conveyor 12.

The prism 42 is preferably a right angle prism with a diffuse surface 50 and a specular surface 52. The shape and position of the optical prism 42 overcomes certain geometrical limitations presented by the prior art. As can be seen in FIG. 3, many prior art devices included a symmetrical reflector surface A providing a beam of light to a package surface B, which in turn is reflected at an incident angle D to a lens C of an optical system. Illuminance to the lens C decreases proportionately relative to the cosine of the incidence angle D. By using the right angle optical prism 42, the angle of incidence is zero, and the illuminance reaching the optical system is maximized. Moreover, illuminance decreases proportionately to the second power of the distance between the reflector A and the object surface B. Use of the prism 42 permits the use of short-focused reflectors, placing the reflector closer to the encoded labels, and further increasing line brightness reflected to the optical system. The prism 42 is also advantageous over other types of reflectors in that the prism returns some light reflected from the encoded labels 16 to the reflector 26 making illumination returned to the reflector more even.

Experiments with different light sources for the lamp 40 of the present invention in conjunction with the elliptical reflector surfaces 27, 29 demonstrate that different types of lamps develop different illumination patterns. The patterns depend upon the size of line filaments and other structural elements, such as the lamp envelope which shadows the emitted light. Metal halide lamps generally have cylindrical emitting surfaces which are shorter and of larger diameters compared to high pressure sodium lamps. Therefore, shadowing is significant in the metal halide lamps when the lamps are used in a horizontal orientation as is described above. Arranging the metal halide lamps 60 in a vertical position, such as is shown in FIG. 4, substantially eliminates the shadowing problem. In addition, arranging the metal halide lamps in this configuration develops a magnified image of the light source in the reflectors' conjugate focal axes 32, 34 and contributes to an illumination of the area between the conjugate focal axes 32, 34. This arrangement increases the region 48 and improves illumination of objects of various heights. To accommodate a wide conveyor 12 in which encoded labels may need to be scanned at different points along the width of the conveyor, a number of the vertically-oriented metal halide lamps 60 may be aligned along the horizontal common focal axes 30.

The processor 22 described may be a general purpose programmable microprocessor of the type well known to those skilled in the art. Furthermore, such a processor 22 may be programmed by a programmer of ordinary skill to accept the inputs, perform the functions, and provide the outputs required for the operation of the present invention, given the description contained herein.

While this invention has been described in detail with particular reference to preferred embodiments thereof, it will be understood that variations and modifications can be effected within the spirit and scope of the invention as described hereinbefore and is described in the appended claims. For example, while the unsymmetrical elliptical reflector surfaces 27, 29 have been described as being used in an optical scanning system 20, it is to be understood that the reflectors could be used in other applications that require high resolution image acquisition. Moreover, the elliptical reflector system described could be used with another type of optical deflection system other than the optical prism 42. Furthermore, it is to be understood that terms and orientations described, such as "vertical", "horizontal", "top", and "bottom", are given for ease of reference only, and the invention described herein can be arranged in any convenient manner.

What is claimed is:

1. A device for illuminating an elongate region, comprising:
   a light source; and
   an elongate reflector comprising:
      an elongate first internal reflective elliptical surface defining an elongate first focus and an elongate first conjugate focus; and
      an elongate second internal reflective elliptical surface defining an elongate second focus and an elongate second conjugate focus,
   the first and second foci being substantially coextensive, and the light source being proximate to the the first and second foci,
   the first conjugate focus being separated from the second conjugate focus by a distance, and
   light from the light source being reflected for illuminating an elongate region extending along and between the first and second conjugate foci.

2. The device of claim 1, wherein the first and second conjugate foci comprise first and second conjugate focal axes.

3. The device of claim 1, wherein the first focus comprises a focal axes.

4. The device of claim 3, wherein the second focus comprises a focal axes.

5. The device of claim 4, wherein the second focal axes and the first focal axes are located substantially parallel to and along a single straight line.

6. The device of claim 5, wherein the light source comprises an elongate lamp.

7. The device of claim 6, wherein the elongate lamp extends substantially parallel to and along the single straight line.

8. The device of claim 1, wherein the first focus, the first conjugate focus, the second focus, and the second conjugate focus are located substantially parallel to and within a single plane, and wherein the internal reflective surfaces of the reflector are unsymmetrical about the single plane.

9. The device of claim 5, wherein the first conjugate focus, the second conjugate focus, and the single straight line are located substantially parallel to and within a single plane.

10. The device of claim 9, wherein the internal reflective surfaces of the reflector are located substantially on opposite sides of the single plane.

11. The device of claim 9, further comprising an optical deflection system located along the single plane between the single straight line and the first and second conjugate foci, the optical deflection system designed to refract light reflected from an object located in the elongate region to an optical scanning system.

12. The device of claim 11, wherein the optical deflection system comprises a right angle prism.

13. The device of claim 9, further comprising a plurality of lamps located along the single line.

14. The device of claim 13, wherein the lamps are elongate and extend along the single plane substantially perpendicular to and through the single line.

15. The device of claim 1, wherein at least a portion of the first internal reflective elliptical surface is separated a distance from the first and second foci which is substantially the same as a distance separating a portion of the second internal reflective elliptical surface from the first and second foci.

16. A method of illuminating an object within an elongate region, comprising the steps of:

reflecting light from a light source located at an elongate first elliptical focus from an elongate first internal reflective elliptical surface to an elongate first conjugate focus; and reflecting light from the light source from an elongate second internal reflective elliptical surface to an elongate second conjugate focus, the first conjugate focus being separated from the second conjugate focus by a distance, wherein the light reflected from the first internal reflective elliptical surface and the light reflected from the second internal reflective elliptical surface illuminate an elongate region extending along and between the first and second conjugate foci; and passing the object through the elongate region.

17. A reflector comprising:

an elongate first internal reflective elliptical surface defining a first focus and a first conjugate focus; and an elongate second internal reflective elliptical surface defining a second focus and a second conjugate focus, the first and second focus being located substantially in a single location that is located in a single plane with the first conjugate focus and the second conjugate focus, the internal reflective surfaces of the reflector being located substantially on opposite sides of the single plane, and the internal reflective surfaces of the reflector being unsymmetrical about the single plane.

18. The reflector of claim 17, wherein the first focus comprises a focal axes, the second focus comprises a focal axes, the second focal axes and the first focal axes are located substantially parallel to and along a single straight line, the first conjugate focus comprises a first conjugate focal axes, the second conjugate focus comprises a second conjugate focal axes, and wherein the single straight line, the first conjugate focal axes and the second conjugate focal axes are located in the single plane.

19. The reflector of claim 17, wherein at least a portion of the first internal reflective elliptical surface is separated a distance from the single location which is substantially the same as a distance separating a portion of the second internal reflective elliptical surface from the single location.

20. A device for illuminating an elongate region, comprising:

a light source; and a reflector comprising:

a first internal reflective elliptical surface defining a first focal axes and a conjugate focal axes; and a second internal reflective elliptical surface defining a second focal axes and a second conjugate focal axes, the first and second focal axes located substantially parallel to and along a single line, the light source located at the single line, the single line, the first conjugate focal axes, and the second conjugate focal axes being located substantially parallel to and along a single plane, and the internal reflective surfaces of the reflector being located substantially on opposite sides of the single plane.

* * * * *